(No Model.) 2 Sheets—Sheet 2.
L. BLANCHARD.
MOWING MACHINE.
No. 262,637. Patented Aug. 15, 1882.
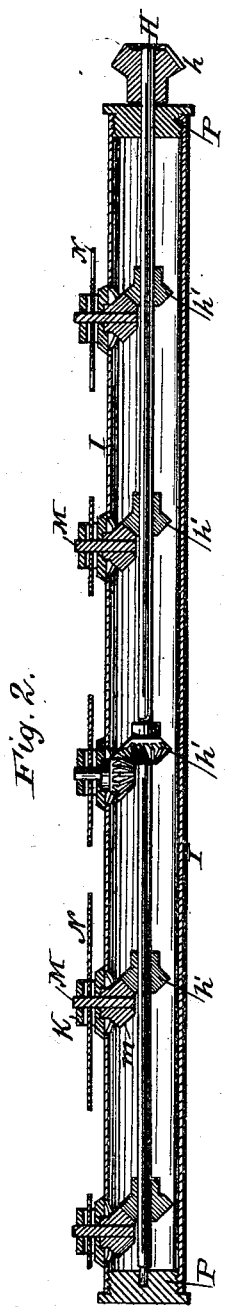
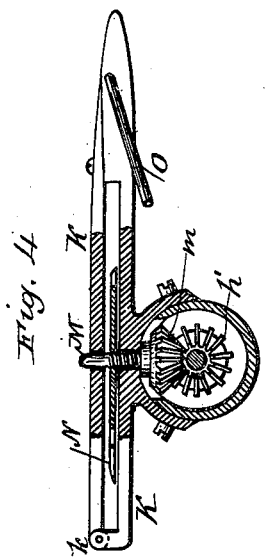
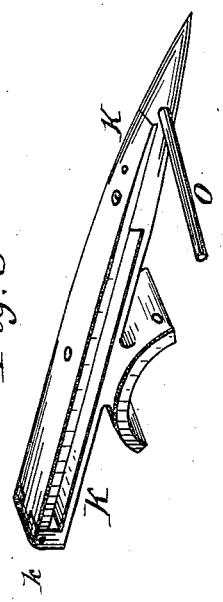
Witnesses:
W. B. Masson
Samuel J. Price.
Inventor:
Loren Blanchard
By H. L. Smith
Atty

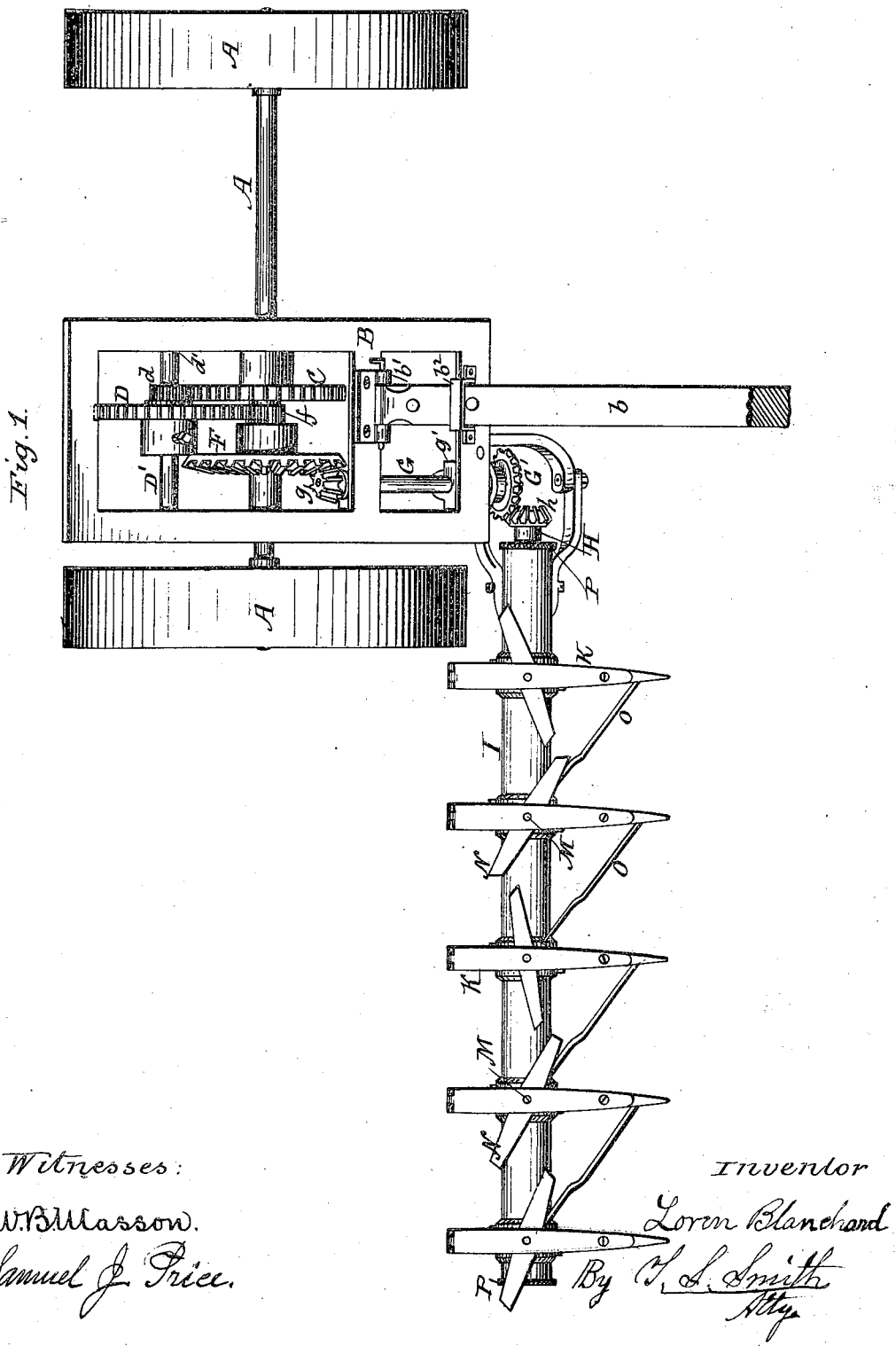

UNITED STATES PATENT OFFICE.

LOREN BLANCHARD, OF MUNSON, MICHIGAN.

MOWING-MACHINE.

SPECIFICATION forming part of Letters Patent No. 262,637, dated August 15, 1882.

Application filed April 29, 1882. (No model.)

*To all whom it may concern:*

Be it known that I, LOREN BLANCHARD, a citizen of the United States, residing at Munson, in the county of Lenawee and State of Michigan, have invented certain new and useful Improvements in Mowing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improved mowing-machine having revolving cutters; and the novelty consists in the construction and arrangement of parts, as will be more fully hereinafter set forth, and specifically pointed out in the claims.

Rigidly secured to a revolving axle, which is rigid with the carrying-wheels of an ordinary carriage, is a sleeved cog-wheel, which meshes with a pinion upon a cog-wheel upon a shaft journaled in a rectangular frame, which is the main frame of the device. This latter cog-wheel meshes with a pinion upon a shaft having also a bevel-gear which is hung loosely upon the axle, and which meshes with a smaller bevel-gear upon a shaft journaled in the main frame. Upon the opposite end of this shaft, which is arranged at right angles to the axle, is a bevel-gear which meshes with a similar gear upon the cutter-operating shaft. This train of gearing is multiplying, and the operating-shaft is arranged within a cylindrical finger-bar, and carries at proper distances apart thereon rigid bevel-gears. These gears mesh with similar gears upon vertical shafts which pass through the upper portion of the cylindrical finger-bar, and upon these vertical shafts are rigidly secured in any proper manner the revolving cutting-knives, while the upper ends of these shafts are journaled in the upper hinged arm of the finger-guards. It will be understood that the operating-shaft is much smaller than the diameter of the finger-bar, and that its outer end is journaled in a removable thimble which fits neatly in the finger-bar at its outer end.

After this general description I will more particularly describe the specific construction by referring to the accompanying drawings, which form a part of this specification, and in which—

Figure 1 is a top plan view; Fig. 2, a vertical section taken through the center of the cutter-bar; and Fig. 3, a perspective view of one of the guards, cutters, vertical shaft, and operating-gears broken away. Fig. 4 is a side elevation.

Referring to the said drawings, A represents the main axle, and A' the wheels, which are rigid therewith. These are of ordinary construction and form no part of this invention, except as they serve in connection with the other parts.

B represents the main frame, also rigid with the axle, and to which the tongue $b$ is secured at $b'$ and operates in a guide, $b^2$.

Keyed or otherwise rigidly secured to the axle A is a cog-wheel, C, which meshes with a pinion, $d$, upon a cog-wheel, D, which is secured upon a shaft, D', journaled in the main frame B at $d'$. This wheel D meshes with a pinion, $f$, upon a bevel-gear, F, which in turn meshes with a bevel-pinion, $g$, rigid upon a shaft, G, journaled in the main frame B at $g'$. Upon the opposite end of the shaft G is a bevel-gear, G', which meshes with a bevel-pinion, $h$, upon the operating-shaft H, which revolves within a cylindrical finger-bar, I. The shaft H is much smaller than the internal diameter of the finger-bar, and carries rigidly at proper distances apart bevel-gears $h'$, which mesh with similar gears, $m$, upon vertical shafts M, which extend up through the upper portion of the cutter-bar I.

Secured upon the upper portion of the finger-bar, at positions corresponding to bevel-gears $h'$ upon the operating-shaft, are finger-guards K, which are hinged at $k$, and the arms secured at the front portion by means of a screw. The upper arms of the finger-guards K furnish journal-bearings for the upper extremities of the shafts M, and between the arms of the finger-guards K, rigid upon the shafts M, are secured by key, screw, or otherwise the revolving cutting-knives N.

To insure that all the grass shall meet the cutting-edges of the cutters I provide braces, O, which extend from the points of the finger-guards to the cutter-bar, as shown.

The outer end of the operating-shaft is journaled in a cap or thimble, P, secured in the end of the cylindrical cutter-bar. The cutter-bar is pivoted to the main frame in any desirable manner, and any proper means may be employed for elevating it.

Should it be desired to "back" or reverse the machine, it is only necessary to throw either of the gears D F G out of operation, and any proper means for accomplishing this may be employed.

Various modifications in details of construction may be employed without departing from the principle or sacrificing the advantages of my invention, the essential features of which are the cylindrical cutter-bar, the revolving cutters, the hinged finger-guards, and the operating-shaft and its connections.

Having thus fully described my invention, what I claim, and desire to secure by Letters Patent of the United States, is—

1. The shaft G, having journal-bearings at each end for the operating-shaft and bevel-gear G′, the shaft H, having bevel-pinion $h$, and having rigidly mounted along its length bevel-gears $h'$, the cylindrical finger-bar I, vertical shafts M, having gears $m$, adapted to engage with the gears $h'$, and the revolving cutting-knives N, mounted upon said shafts M, substantially as and for the purpose set forth.

2. The combination of the cylindrical finger-bar I, shaft H, having gears $h'$, vertical shafts M, having bevel-gears $m$, the cutters N, and the hinged finger-guards K, forming journal-bearings for said shafts M, substantially as and for the purpose set forth.

3. The shaft H, having the series of bevel-gears $h'$, combined with the cylindrical finger-bar I, having cap P, and with a series of cutters, N, operated by said gears $h'$, substantially as and for the purpose set forth.

In testimony whereof I affix my signature in presence of two witnesses.

LOREN BLANCHARD.

Witnesses:
 H. CLAY SMITH,
 SIMON JOSEPH.